United States Patent Office.

ALFRED GALLINEK AND EMIL COURANT, OF BERLIN, GERMANY, ASSIGNORS ASSIGNORS TO THE FARBWERKE, VORMALS MEISTER, LUCIUS & BRÜNING, OF HÖCHST-ON-THE-MAIN, GERMANY.

PROCESS OF MANUFACTURING ESTERS OF DIIODOSALICYLIC ACID.

SPECIFICATION forming part of Letters Patent No. 575,227, dated January 12, 1897.

Application filed May 23, 1896. Serial No. 592,830. (Specimens.)

*To all whom it may concern:*

Be it known that we, ALFRED GALLINEK and EMIL COURANT, doctors of philosophy, citizens of the Empire of Germany, residing at Berlin, Germany, have invented a certain new and useful Improved Process of Manufacturing Esters of Diiodosalicylic Acid, of which the following is a specification.

We have discovered that the new diiodosalicylic esters are obtained—

(a) By the action of iodin upon the esters of salicylic acid in presence of a substance which combines or decomposes the hydriodic acid formed by the reaction—for instance, alkalies, metallic oxids, carbonates, acetates, or oxidizing agents, such as iodic acid, chlorin, and manganese dioxid. Two molecular proportions of iodin dissolved in alcohol or other indifferent solvent are introduced into a solution of one molecular proportion of salicylic-acid ester in alcohol or the like. An excess of mercury oxid, zinc oxid, or lead oxid, &c., is then added. On cooling the filtered solution the iodo ester crystallizes out from the same, which has been previously freed from mercury iodid by means of ammonium sulfid. Two molecular proportions of iodin dissolved in iodid of potassium are run into a solution of one molecular proportion of salicylic-acid ester in one equivalent of dilute aqueous alkali, two further equivalents of alkali being then added. After the reaction is completed an acid is added—for instance, sulfuric acid—which decomposes the partly-precipitated alkaline salts, so that the diiodo esters are obtained in free state.

(b) By the esterification of diiodosalicylic acid. The solution of diiodosalicylic acid in methyl, ethyl, or other alcohol is either saturated with hydrochloric acid in the heat or heated under addition of sulfuric acid and the ester precipitated therefrom with water; or the salts of diiodosalicylic acid are treated with alkylhaloids. Thus, for instance, by heating the silver-salt with methyliodid diiodosalicylic-methyl ester is obtained. Diiodosalicylic-acid methyl ester melts at 110°. It crystallizes in thin long brilliant needles, which are fairly soluble in hot alcohol, (about ten per cent.,) with difficulty soluble in cold alcohol, very easily in ether. It has the formula

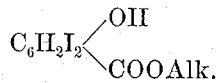

Diiodosalicylic-acid ethyl ester melts at 132°. It crystallizes in quadrilateral almost square white tablets and is considerably less soluble in alcohol and ether than the methyl ester. Both esters are soluble with difficulty in water.

The new esters are to be employed as therapeutical remedies. They are intended for use as a substitute for iodoform on wounds and are used in quantities according to the size and condition of the same.

Having thus described our invention, we claim as new and desire to secure by Letters Patent—

1. The process herein described of manufacturing the esters of diiodosalicylic acid, which consists in subjecting salicylic-acid esters to the action of iodin in the presence of a compound which combines with the hydroiodic acid formed, substantially as set forth.

2. As a new product, the alkyl ester of the diiodosalicylic acid, being a white crystalline compound, soluble with difficulty in water, but easily in ether and hot alcohol and having the formula:

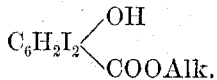

In testimony that we claim the foregoing as our invention we have signed our names in presence of two subscribing witnesses.

ALFRED GALLINEK.
EMIL COURANT.

Witnesses:
W. HAUPT,
CHARLES H. DAY.